C. NELSON.
COFFEE MACHINE.
APPLICATION FILED JULY 17, 1907.
1,080,774.
Patented Dec. 9, 1913.
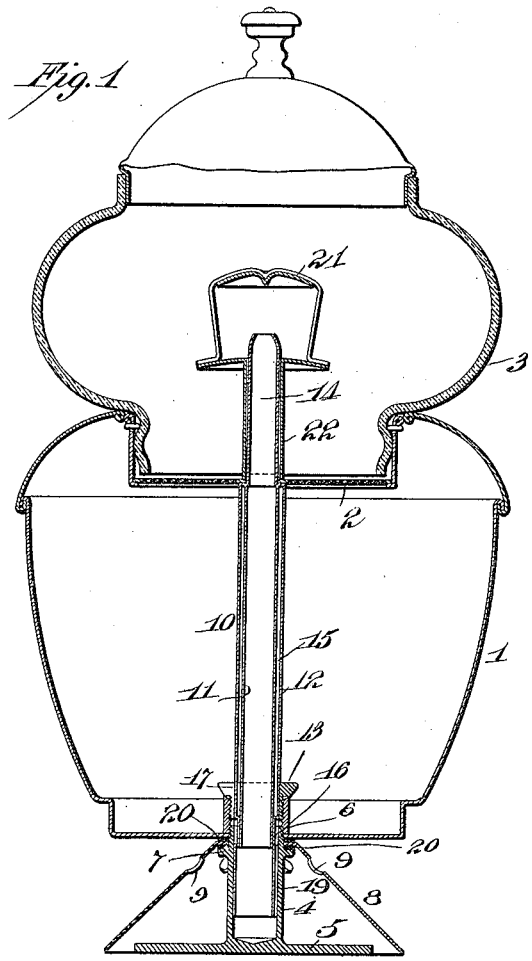
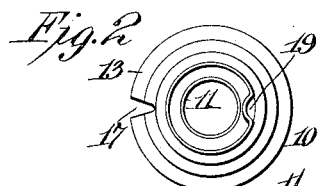
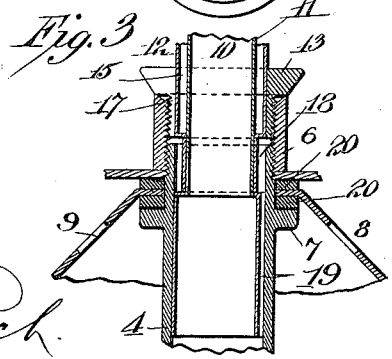
Witnesses:
Inventor
Charles Nelson
By Dyer & Dyer
Attorneys.

UNITED STATES PATENT OFFICE.

CHARLES NELSON, OF BROOKLYN, NEW YORK, ASSIGNOR TO S. STERNAU & CO., OF NEW YORK, N. Y., A COPARTNERSHIP COMPOSED OF SIGMUND STERNAU AND LIONEL STRASSBURGER.

COFFEE-MACHINE.

1,080,774.  Specification of Letters Patent.  Patented Dec. 9, 1913.

Application filed July 17, 1907. Serial No. 384,201.

*To all whom it may concern:*

Be it known that I, CHARLES NELSON, a subject of the King of Sweden, residing in the borough of Brooklyn, county of Kings, and State of New York, have invented an Improvement in Coffee-Machines, of which the following is a specification.

The object I have in view is the production of a machine for making infusions of coffee, tea and other materials, and for analogous purposes, which will have advantages over others heretofore made. Among these advantages will be reduced cost, greater simplicity and greater efficiency. I attain these objects by the mechanism illustrated in the accompanying drawings, in which—

Figure 1 is a section of a portion of a coffee machine embodying my invention; Fig. 2 is an enlarged bottom view of the percolator; and Fig. 3 is a section thereof, also showing a portion of the heating chamber.

In all of the views like parts are designated by the same reference characters.

In carrying out my invention I provide the usual receptacle 1, adapted to contain the water at first and the infusion afterward—the latter being drawn off through the usual cock or faucet, not shown. In the upper end of the receptacle 1 is a screen or perforated receptacle 2 for the coffee or other material of which the infusion is to be made. Above this is shown the usual globe 3, by means of which the operation of the percolator may be observed and the color of the infusion ascertained by the user. The receptacle 1 is adapted to be supported upon the usual stand, not shown; to its bottom is secured the heating chamber 4, the latter extending downward below the receptacle.
The chamber is open at its upper end and communicates with the interior of receptacle 1, is closed at its lower end, and is provided with a flange 5, the latter being for the double purpose of conducting heat into the chamber and insulating the bottom of the receptacle. The inside of the heating chamber 4 is preferably cylindrical in shape; it is preferably vertical and is co-incident with the center of the receptacle.
It is best attached to the receptacle by the means shown, which comprises the nut 6, engaging with screw threads formed on the upper end of the chamber, the nut being within the receptacle 1 and engaging with the bottom thereof. The receptacle is provided with a flange 7, which is adapted to lie below the bottom of the receptacle 1, the bottom, together with the skirt 8, being pinched between the flange and the nut. The skirt 8 is preferably of the shape shown, being attached to the chamber adjacent to the bottom of the receptacle and depending downward and outward to inclose the flange 5. This skirt is shown as provided with perforations 9 near its upper edge. The skirt serves the purpose of causing the heated products of combustion to circulate around the outside of the heating chamber 4 so that the heating effect of the lamp will be increased. The perforations 9 are for the purpose of causing the heated products of combustion to more perfectly circulate around the outside of the heating chamber 4, and through the space encompassed by such chamber and the skirt 8.

The percolator 10 serves as a means of communication between the heating chamber 4 and the globe 3, and is a means for causing liquid to pass from the receptacle 1 into the globe and to be sprayed upon the coffee or other material carried by the screen 2. The percolator is preferably vertical, and passes through the screen 3 at its center, although it is to be understood that the position and location of the percolator is not essential.

The percolator comprises an inner tube 11, an outer tube 12, a base fitting 13, and a nozzle 14. The outer tube 12 as shown has substantially the same outer diameter as the internal diameter of the heating chamber 4. It extends from a point near the bottom of that chamber up to preferably on a level with the bottom of screen 2. The inner tube 11 is smaller than the outer tube, so that the air space 15 will be formed between the two. The inner tube is of small size; for a machine of average size about three-eighths of an inch internal diameter. The nozzle 14 may be a continuation of the inner tube 11 or a smaller tube connected thereto. The upper end of the nozzle is contracted so as to increase the velocity of the issuing jet of liquid, although this is not essential.

The base fitting 13 is secured to the outer tube 12 by any suitable means as by soldering, and is provided with screw threads, which engage with the threads in the nut 6. This nut 6, therefore, serves the double purpose of holding the heating chamber 4 in place and in supporting the percolator. The upper portion of the base fitting is preferably flanged, as shown in Fig. 3, so as to extend outward and rest upon the upper end of the nut 6.

Means is provided to permit entrance of the liquid of the receptacle 1 to the interior of the heating chamber 4. This is made by means of a passage, which is not a straight passage but is crooked or labyrinthine, so that the liquid cannot be readily forced through it at high velocity but will be free to flow through it at low velocities. This passage is indicated in Fig. 1 by the character 16. The upper portion of it is formed within the base fitting 13, and consists of a notch or groove 17 formed in such fitting and extending throughout the depth of the latter. The next part of the passage is formed by constricting or reducing in diameter the outer tube 12 at 18. This will form an annular passage, the outer walls of which are made by the inner walls of the heating chamber 4, the top and bottom and inner walls being formed by the constriction 18 in the tube 12. This constriction is preferably made of the same diameter as the inner tube 11, the latter being secured to the outer tube at this point. The third part of the passage is made by means of a groove 19, made in the outer tube and extending from the constricted portion to the lower end thereof. The groove 19 and notch 17 are preferably diametrically opposite each other, as shown.

The passage for the liquid from the interior of the receptacle 1 to the interior of the heating chamber 2 must therefore be through the notch 17, the annular passage surrounding the constriction 18, and the groove 19. The inside of the percolator is unobstructed and is best perfectly straight; the liquid will therefore have a free passage from the inside of the heating chamber 4 up through the inner tube 11 and may be discharged through the nozzle 14.

In order to prevent the circular passage adjacent to the constriction 18 from receiving heat by conduction from the skirt 8, the latter may be clamped between insulating rings 20—20, arranged respectively one on each side of the skirt, one being engaged by the flange 7 and the other by the bottom of the receptacle 1. The upper of the two rings will also serve as a packing means to prevent leakage from the interior of the receptacle 1 around the heating chamber 4.

The usual deflector 21 is shown, supported upon the tube 22 secured to the base of the screen 2. The deflector 21 is not essential as its function may be carried out by other means; furthermore, if it is used it may be supported in different ways from that shown.

The operation of the apparatus is as follows: The requisite amount of water is placed within the receptacle 1, and will flow through the labyrinthine passage 16 into the heating chamber 4, and will rise in the inner tube 11 to the height of the water in the receptacle 1, or slightly higher, owing to capillary action. The requisite amount of coffee, tea or other material of which the infusion is to be made is introduced within the screen 2 and globe 3, and heat is then applied to the flange 5 by a lamp or other heating means. The products of combustion from the heating means will pass around the edges of the flange 5 and will impinge against the lower edge of the skirt 8, circulating between the chamber 4 and skirt 8, and adding heat to such chamber which would otherwise be lost. The water within the chamber 4 will be quickly heated, but owing to the comparatively small diameter of the percolator such water will not have an opportunity to circulate before the water within the heating chamber 4 is converted into steam. This will drive up the water which is within the percolator above the chamber 4 and cause it to pass through the nozzle 14 and be sprayed upon the coffee which is contained within the screen 2. Upon the pressure being relieved by the discharge of the water through the nozzle 14, its place will be taken by water from the receptacle 1 passing through the labyrinthine passage. This water will be heated and a portion of it discharged in the same manner. The air space 15 effectively prevents the heated contents of the percolator from imparting its heat to the contents of the receptacle 1. The length and shape of the passage 16 is such that it offers an obstruction to the discharge of the liquid from the receptacle 4 by means of the expansion of the steam in such receptacle, so that little or no liquid is discharged through said passage. The liquid, therefore, circulates upward through the percolator and descends from the screen 2 into the receptacle.

The apparatus may be readily cleansed by removing the percolator and introducing a brush or other tool into the interior of the heating chamber 4. By unscrewing the nut 6 the heating chamber and skirt 8 may be removed.

By forming the percolator of tubes with the comparatively small and simple base fitting 13, the cost of the device is reduced from those heretofore made.

I find that the apparatus is very efficient, one coffee machine made by me produced a strong infusion of coffee from cold water within twelve minutes after starting; the water being discharged through the nozzle 14 within two minutes after the lamp was applied. The action, I find, is as rapid and effective as structures employing a valve, which are objectionable owing to the difficulty of cleansing them, and their liability to be choked and rendered inoperative by coffee grounds or other solid matters in the liquid engaging with the valve.

The broad features of the invention which comprise a circuitous or labyrinthine passage as a means of communication between the heating chamber and the receptacle of the coffee machine, are not claimed in this application but are claimed in another application.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim as new and desire to secure by Letters Patent, is:

1. A percolator for a coffee machine having an inner tube, an outer tube forming an air space between the two and a base fitting, the outer tube being constricted adjacent to the base fitting, there being a notch in the base fitting and a groove in the outer tube, both communicating with the constricted portion.

2. A coffee machine having a receptacle and a heating chamber, the said heating chamber having a flange outside of the receptacle and a nut inside of the receptacle, there being a skirt clamped between the flange and bottom of the receptacle, said skirt being perforated adjacent to its upper portion.

This specification signed and witnessed this 12th day of July, 1907.

CHARLES NELSON.

Witnesses:
JOHN L. LOTSCH,
FLORENCE B. LAWSON.

---

Copies of this patent may be obtained for five cents each, by addressing the "Commissioner of Patents, Washington, D. C."